March 2, 1971    T. J. WALL ET AL    3,566,632
STEERING COLUMN AND TRANSMISSION CONTROL LOCK
Filed May 17, 1968    2 Sheets-Sheet 1
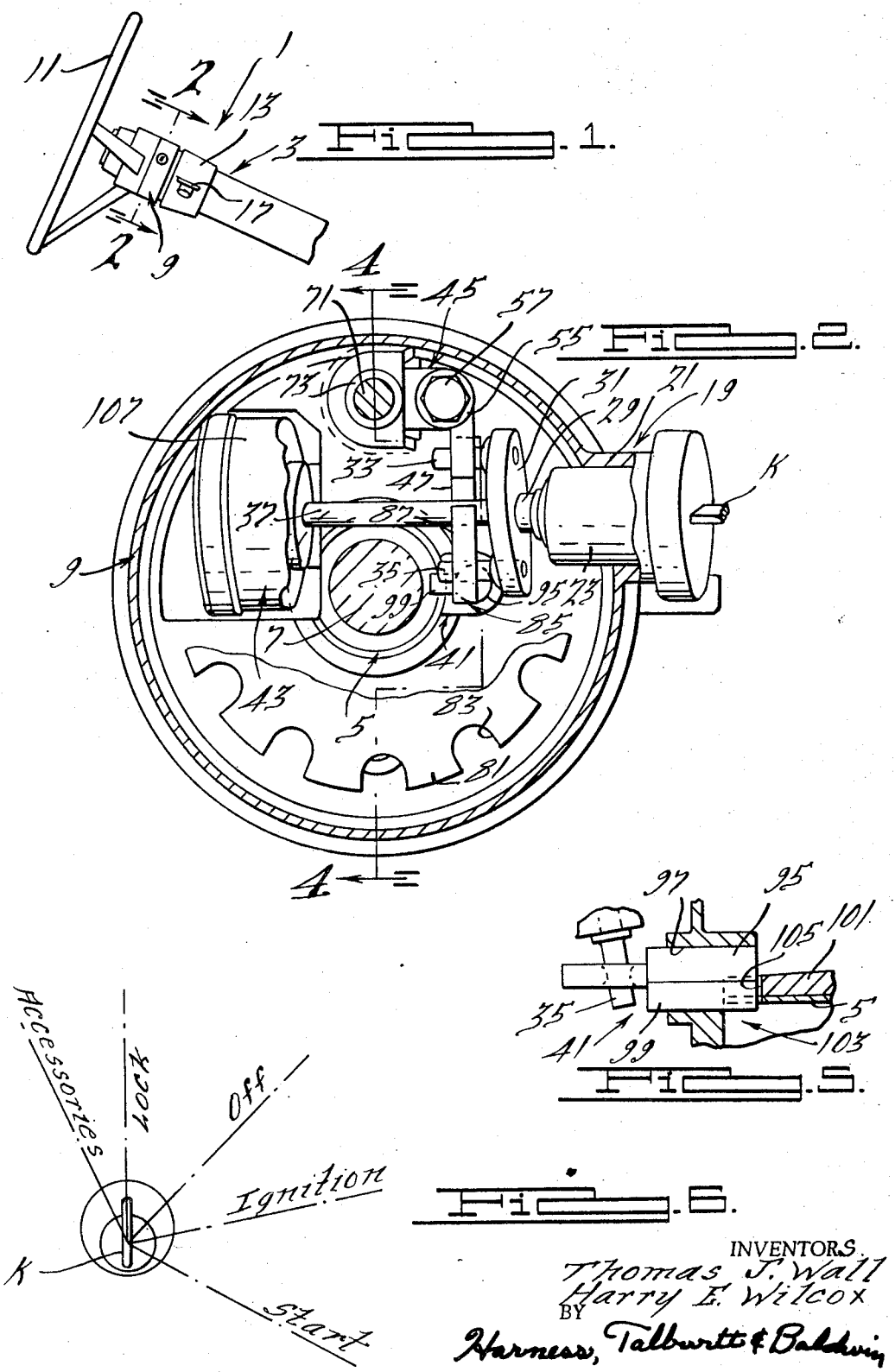
INVENTORS
Thomas J. Wall
Harry E. Wilcox
BY
Harness, Talburtt & Baldwin
ATTORNEYS

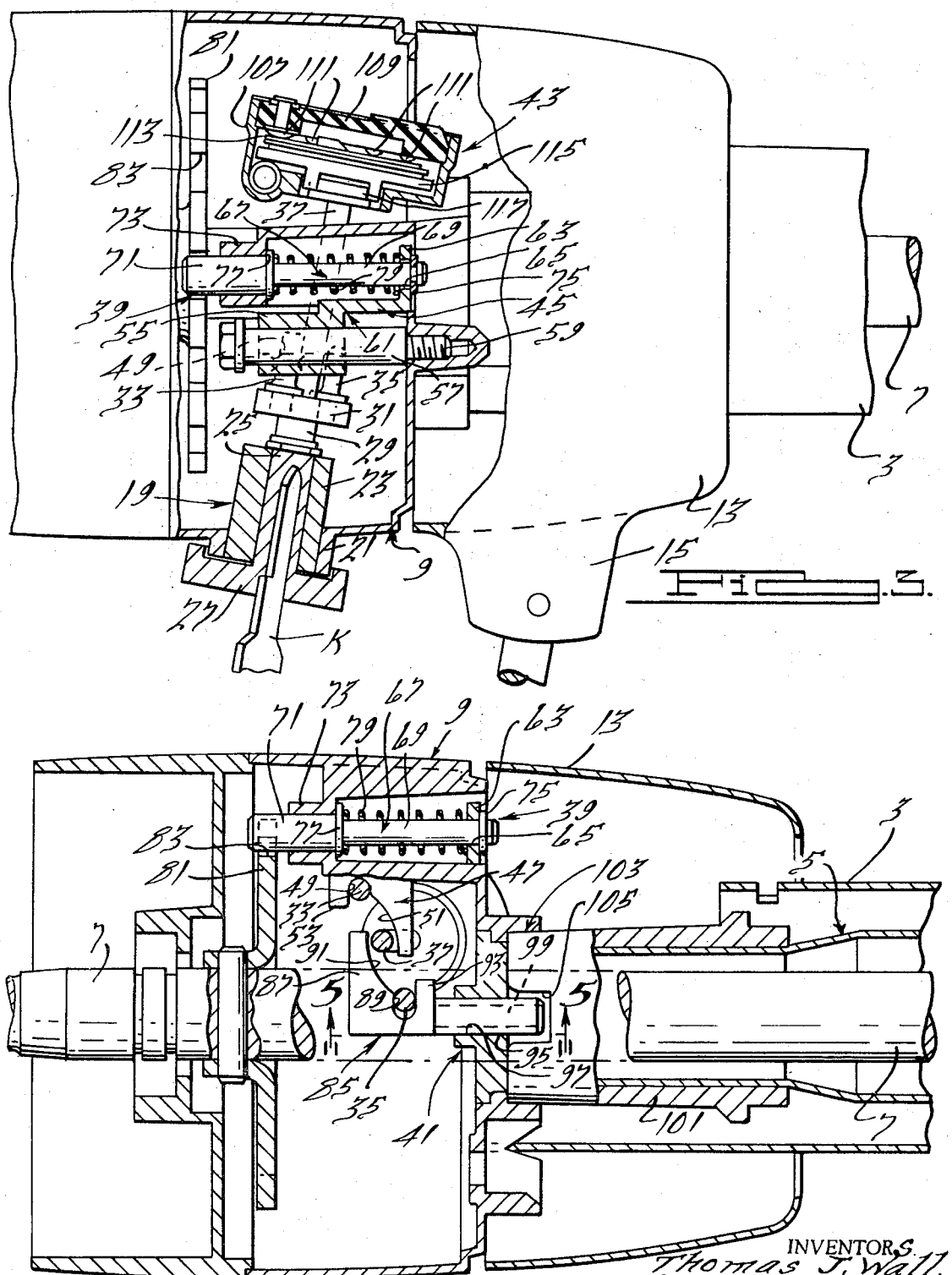

United States Patent Office 3,566,632
Patented Mar. 2, 1971

3,566,632
STEERING COLUMN AND TRANSMISSION CONTROL LOCK
Thomas J. Wall, Southfield, and Harry E. Wilcox, Livonia, Mich., assignors to Chrysler Corporation, Highland Park, Mich.
Filed May 17, 1968, Ser. No. 729,965
Int. Cl. B60r 25/02, 25/06; F05b
U.S. Cl. 70—248                                          7 Claims

ABSTRACT OF THE DISCLOSURE

Improved steering, transmission and ignition lock apparatus for an automotive vehicle steering column including two locking pins movable in opposite directions and keeper plates located, respectively, on the steering shaft and the shift tube. A single control mechanism operates the movements of both locking pins as well as an ignition switch. The three locking components are all located within a housing on the steering column.

BACKGROUND OF THE INVENTION

This invention relates to automotive vehicle locking systems, and more particularly to improved steering, transmission and ignition lock apparatus for automotive vehicles.

This invention is an improvement in locking arrangements of the type which are adapted to lock a vehicle steering component, and a transmission selecting component for manually selecting the various transmission operating ranges of the vehicle transmission, both of the components forming part of an automotive steering column assembly. This invention also provides a locking means for the vehicle ignition system.

SUMMARY OF THE INVENTION

Briefly, this invention comprises a locking apparatus for an automotive vehicle including means for locking a steering shaft, means for locking a transmission selector tube and means for disabling the ignition circuit of the vehicle.

One of the primary objects of this invention is to provide an automotive vehicle locking system for locking the transmission, steering and ignition components of the vehicle in which access to and tampering with any of the components are rendered extremely difficult.

Another object of this invention is to provide a locking system of the class described which is compact and substantially simultaneously operative to lock the respective components with which they are associated.

A further object of this invention is to provide a locking apparatus of the type described in which the locking components are urged toward locking position by a single manual movement of a control member, such as a key.

Still another object of this invention is to provide locking apparatus, such as described, wherein the control member cannot be moved to a locking position until the transmission range selector is located in a predetermined position.

A further object of this invention is to provide a locking system, such as described, which is economical in construction and effective in operation.

Other objects and advantages of this invention will be made apparent as the description progresses.

BRIEF DESCRIPTION OF THE DRAWINGS

In the accompanying drawings, in which one of various embodiments is illustrated:

FIG. 1 is a fragmentary plan view of an automotive vehicle steering column construction including the steering, transmission and ignition locking apparatus of this invention;

FIG. 2 is an enlarged section taken generally along lines 2—2 of FIG. 1;

FIG. 3 is a plan view of FIG. 2, certain parts being broken away for clarity;

FIG. 4 is a section taken generally along lines 4—4 of FIG. 2;

FIG. 5 is a section taken generally along lines 5—5 of FIG. 4; and

FIG. 6 is a diagrammatic side elevation view of a portion of the locking mechanism, illustrating various key positions.

Like parts are shown by corresponding reference characters throughout the several views of the drawings.

DESCRIPTION OF THE PREFERRED EMBODIMENT

Referring now to the drawings, a steering column assembly for an automotive vehicle is generally indicated at 1 in FIG. 1. As will be understood, the assembly 1 is mounted in the passenger compartment and extends through a firewall (not shown) to the engine compartment. The steering column assembly is connected to the vehicle body and firewall by conventional mounting structure (not shown) and basically includes a supporting outer tubular column 3 within which a transmission range selector tube 5 and a steering shaft 7 are rotatably mounted.

The column 3 is provided at its upper end with a stationary and preferably cast housing 9 which contains the locking apparatus of this invention. Housing 9 serves as a mounting for the upper end portion of the steering shaft 7 which is rigidly secured by conventional means (not shown) to the hub of the vehicle steering wheel 11. A transmission selector or shift bowl 13 is rotatably mounted by conventional mounting structure (not shown) immediately below housing 9. Bowl 13 has a mounting portion 15 to which the usual shift lever 17 is connected.

Conventional shift tube 5 extends downwardly through the support tube 3 and is adapted to be rotated by conventional means (not shown) upon rotational movement of shift lever 17. Steering shaft 7 extends through shift tube 5 to a steering mechanism in the engine compartment.

Referring now more specifically to the locking apparatus of this invention, the same includes a conventional cylinder lock actuator 19 mounted within a boss 21 on housing 9. Cylinder lock actuator includes a casing 23 and an inner core 25 having an outer head 27 thereon. Lock 19 has a conventional tumbler construction and home position locking mechanism which, upon the insertion of a properly coded key K, permits the key to rotate the core 25, but which prevents the withdrawal of the key unless the latter is in a "home" position.

A splined or similar rotatable drive connection 29 is provided between the inner end of core 25 and an actuating plate or member 31. Plate 31 is adapted to be rotated through a predetermined angle upon rotation of key K and includes two drive pins 33 and 35 disposed on opposite sides of the axis of rotation and an elongated control rod or shaft 37 extending from the plate along the axis of rotation thereof. Pins 33 and 35 and shaft 37 are respectively adapted to control a steering shaft locking mechanism 39, a shift tube locking mechanism 41, and an ignition and starter switch component 43.

Steering shaft locking mechanism 39 includes a link or follower member 45 having a wing portion 47 thereon. Wing portion 47 has a slot 49 therein through which pin 33 extends. Wing 47 is also provided with a sloping and curved guiding edge 51 extending from one side of slot 49 to the outer end of the wing. The edge 51, as will be made apparent, permits the pin 33 to move downwardly as it is rotated without causing downward movement of the follower 45 beyond a predetermined point. The edge also guides the pin 33 and slot 49 back into registration after they have moved out of registering relationship. The pin 33 and slot 49 are prevented from moving out of registering relationship upon movement of actuator 31 in the other rotational direction by an overhang or blocking portion 53 of wing portion 47.

Link 45 also includes a tubular guiding portion 55 slidably mounted on a guide bolt 57 secured, as by threads for example, at its lower end to a receiver cavity 59 formed in housing 9. An L-shaped or stepped portion 61 extends downwardly from the lower portion of tubular guide 55. The lower arm 63 of L-shaped portion 61 has an opening 65 therein through which the lower end of a locking pin or bolt 67 extends.

Locking pin 67 includes a first portion 69 having a first diameter and a second portion 71 having a second and larger diameter, the portion 71 being slidably received in a tubular guide 73 connected to housing 9. A first washer 75 is secured to the lower end of portion 69 below the lower arm 63 of stepped portion 61 and a second washer or shoulder 77 is located at the juncture of portion 69 and 71. Extending between washers 75 and 77 around portion 69 is a compression spring 79. It will be seen that movement of follower 45 upwardly and downwardly on guide bolt 57 tends to cause a similar movement of pin 67.

An annular keeper plate 81 is secured to steering shaft 7 above the upper end of the pin guide 73. Keeper plate 81 has a plurality of bolt or pin receiving notches or openings 83 formed in its outer periphery in an equally spaced relationship. The notches 83 are adapted to be aligned with the upper portion 71 of pin 67 for receiving such upper portion when the pin is moved upwardly in the guide 73 to the FIG. 3 position. It will be seen that when the portion 71 of pin 67 is located in one of the notches 83, the steering shaft 7 is locked against rotary motion.

Shift tube locking mechanism 41 includes a locking pin or member 85 having a wing portion 87 thereon. Wing portion 87 has a slot 89 therein through which pin 35 extends. Wing 87 is also provided with a sloping and curved guiding edge 91 extending from one side of slot 89 to the outer end of the wing. The edge 91 functions in the same manner as edge 51 for the locking pin 85, i.e., the edge 91 permits the pin 35 to move upwardly as it is rotated without causing upward movement of the pin 85 beyond a predetermined point. The edge also guides the pin 35 and slot 89 back into registration after they have moved out of registering relationship. The pin 35 and slot 89 are prevented from moving out of registration upon movement of actuator plate 31 in the other rotational direction by a blocking portion 93.

Locking pin 85 has a solid cylindrical portion 95 extending downwardly from wing 87 through a mating opening 97 in housing 9. Portion 95 has an elongated laterally extending arm 99 thereon which also extends through a mating portion of opening 97.

The upper end of shift tube 5 and the upper end of a casting 101 attached to the upper end of tube 5 form a common keeper portion 103 having a notch 105 therein. Notch 105 is axially aligned with locking pin 87 when the shift tube in a predetermined position, such as when the shift tube 5 is in a position corresponding to a "Park" position of an automatic transmission or the "Reverse" position, for example, of a manual transmission. It will be seen that when locking pin 87 is moved downwardly it will move into notch 105 if the latter is axially aligned with the pin.

Ignition and starter switch component 43 may be of conventional design and similar to the ignition and starter switch presently used on vehicles manufactured by the assignee of this application, and is shown by way of example to comprise a switch housing 107, supporting a terminal plate 109. Plate 109 may have several terminals or contacts 111 thereon, any two or more of which may be electrically connected by one or more bridging plates 113 attached to a rotatable bridge carrier 115. Carrier 115 is joined by a splined connection or the like 117 to the outer end of shaft 37. When the shaft 37 is rotated clockwise as viewed in FIG. 4 to a position corresponding to Start in FIG. 6, the bridge or bridges 113 will connect a starter motor terminal 111 with the power source terminal 111 to energize the former. When the key K is turned to either the Ignition or Accessory position of FIG. 6, the bridge or bridges connects the power terminal with the vehicle ignition circuit and accessory circuits, respectively. However, when the key K is in either the "off" or "lock" position the bridge or bridges 113 do not connect the power source terminal 111 with any other terminal. Ignition switches of this type are well-known and further description thereof is believed unnecessary.

Operation of the apparatus as employed in a vehicle having an automatic transmission is as follows:

It will be assumed that the gear selector lever is in a position other than the Park position, i.e., it is in Reverse, Neutral or one of several Drive positions. The ignition locking core 25 is in a position other than that position designated Lock, and it will be assumed that it is in the Ignition position. In such position, the actuator plate 31 is in a position in which the pins 33 and 35 are clockwise from their FIG. 4 positions an amount sufficient to have lifted pin 85 out of alignment with the upper end of tube 5 and casting 101, and to have pulled pin 67 below keeper plate 81. Accordingly, both the shift tube 5 and steering shaft 7 are rotatable. The pins 33 and 35 have moved out of slots 49 and 89 and will be engaging the outer portions of the edges 51 and 91 when the key is in the Ignition position. Actually, the curve of the edges 51 and 91 substantially correspond to the curvature of the path of the pins 33 and 35 so that when the pins are engaging such edges they do not move the follower 47 and pin 85.

The locking apparatus is operated by turning the key K from the Ignition position first to the Off position. This counterclockwise movement of the key, as viewed in FIG. 6, rotates the actuator plate 31 and accordingly, the shaft 37, clockwise as viewed in FIG. 4, an amount sufficient to rotate the ignition switch bridge or bridges 113 to a position wherein the ignition circuit is interrupted, thereby disabling the engine. When the transmission selector lever is in any position except Park, the notch 105 is not axially aligned with pin 85. Accordingly, any attempt to turn key K to the Lock position will be prevented by the engagement of the lower end of pin 85 with the upper edge of the shift tube 5 and casting 101.

The transmission selector lever 17 must next be turned to the Park position to bring notch 105 into axial alignment with pin 85. The key K is then turned to the Lock position. This movement rotates actuator plate 31 to the position shown in FIGS. 2 and 3. As the actuator plate turns, the pin 35 moves follower portion 87 and pin 85 downwardly to the position shown in FIG. 4, wherein the pin is moved into notch 105. This prevents any substantial rotation of transmission selector tube 5.

As the actuator plate 31 is moved to the position shown in FIGS. 2 and 3, the pin 33 moves follower 45 upwardly to the position shown in FIGS. 3 and 4. In so moving, the arm portion 63 applies an upwardly directed force on the lower end of spring 79. The spring transmits this force to the second portion 71 of locking pin 67, thus tending to force the pin upwardly. If the keeper plate 81 is in a position wherein one of the notches 83 is axially aligned with pin 67, the pin is pushed by spring 79 into such notch, thereby engaging the keeper plate and preventing substantial rotation of the latter, and hence, substantial rotation of steering shaft 7.

If the keeper plate 81 is in a position wherein one of the notches is not aligned with one of the notches 83, the upper end of pin 67 engages the bottom of the plate and spring 79 is compressed by the upward movement of arm 63. A slight rotational movement of steering wheel 11 in either direction will move a notch 83 into alignment with pin 67 and spring 79 then forces the pin into the notch.

Also, as the actuator plate moves to the position shown in FIGS. 2 and 3, the carrier 115 and bridge or bridges 113 are moved to a position wherein the ignition circuit is still interrupted, i.e., the two terminals or contacts 111 which must be electrically connected to complete the ignition circuit are not so interconnected.

Thus, the steering shaft 7 and shift tube 5 are locked against substantial rotation, and ignition switch 43 is disabled. Since all three mechanisms are located within housing 9, tampering is rendered extremely difficult.

The cylinder lock 19 is of such construction that the key K can only be inserted therein and removed therefrom when the core 25 is in the Lock position. Also a plunger switch may be connected to the lock 19 and connected in a circuit with a door operated switch so that if the key K is located in the lock a buzzer will be energized when the door is opened, thereby providing a signal to the driver to remove the key.

While the shift tube 5 shown herein is part of the controls for an automatic transmission, it will be understood that a similar and well-known tube and control mechanism for a manual transmission could be employed. In such case the notch 83 in the tube would be aligned with the pin 85 only when the tube is in a predetermined selection position, such as Reverse for example.

In view of the foregoing, it will be seen that the several objects and other advantages are achiveved.

Although only one embodiment of the invention has been disclosed and described, it is apparent that other embodiments and modifications of the invention are possible.

We claim:

1. In an automotive vehicle steering column structure including a support column connected to the vehicle, a transmission selector member mounted within said column for rotation relative thereto, a steering control member rotatably mounted within said column, locking apparatus comprising a control housing means surrounding said steering control member, first locking means in said housing means, said housing means including first mounting means mounting said first locking means for movement, first keeper means connected to said steering control member for rotation therewith, second locking means in said housing means, said housing means including second mounting means mounting said second locking means for movement, said transmission selector member having a second keeper means thereon rotatable therewith, said first and second locking means being movable between a locking position wherein they are respectively engageable with said first and second keeper means for locking said steering control member and said transmission selector member against substantial movement and a retracted non-locking position wherein said steering control member and said transmission selector member are not locked by said first and second locking means, and control means in said housing means and connected to said first and second locking means and said switch means, said control means being movable in one direction for urging said first and second locking means toward said locking position, said first and second locking means each including a locking pin, said control means including an actuating plate, key operated means for rotating said plate, a guide member secured to said housing means, a follower slideable in said guide member, said follower being connected to said locking pin of said first locking means and movable from a first position wherein said locking pin is held in a nonlocking position to a second position wherein said pin is urged toward a locking position, means on said actuator plate engaging said follower and said locking pin of said second locking means for urging the first and second locking means towards said locking position upon rotation of said actuator plate in one direction.

2. Locking apparatus as set forth in claim 1 further including ignition switch means in said housing movable between an open and closed ignition circuit positions, said control means including a shaft connecting said actuator plate to said switch means for moving the latter upon rotation of said actuating plate.

3. In an automotive vehicle steering column structure including a support column connected to the vehicle, a transmission selector member mounted within said column for rotation relative thereto, a steering control member rotatably mounted within said column, locking apparatus comprising a control housing means surrounding said steering control member, first locking means in said housing means, said housing means including first mounting means mounting said first locking means for movement, first keeper means connected to said steering control member for rotation therewith, second locking means in said housing means, said housing means including second mounting means mounting said second locking means for movement, said transmission selector member having second keeper means thereon rotatable therewith, said first and second locking means being movable between a locking position wherein they are respectively engageable with said first and second keeper means for locking said steering control member and said transmission selector member against substantial movement and a retracted non-locking position wherein said steering control member and said transmission selector member are not locked by said first and second locking means, ignition switch means located within said housing means, said switch means being movable between a first position wherein the ignition circuit of the vehicle is completed through said switch means and a second position wherein the ignition circuit is disabled through said switch means, and control means in said housing means and connected to said first and second locking means and said switch means, said control means being movable in one direction for urging said first and second locking means toward said locking position and said switch means toward said second position, said first and second locking means each including a locking pin, and said control means including an actuating plate, key operated means for rotating said plate, a guide member secured to said housing means, a follower slideable in said guide member, said follower being connected to said locking pin of said first locking means and movable from a first position wherein said locking pin is held in a nonlocking position to a second position wherein said pin is urged toward a locking position, means on said actuator plate engaging said follower and said locking pin of said second locking means for urging the first and second locking means towards said locking position upon rotation of said actuator plate in one direction.

4. Locking apparatus as set forth in claim 3 wherein said control means includes a shaft connecting said actuator plate to said switch means for moving the latter upon rotation of said actuating plate.

5. Locking apparatus for an automotive vehicle steering column structure having a support column connected to the vehicle, a rotatable transmission selector member mounted within said column for rotation relative thereto, a rotatable steering control member rotatably mounted within said column, said locking apparatus comprising a control housing means surrounding said steering control member, first locking means mounted in said housing means for movement in a direction generally parallel to the axis of rotation of said steering control member, first keeper means connected to said steering control member for rotation therewith, second locking means mounted in said housing means for movement in a direction generally parallel to the axis of rotation of said transmission selector member, said transmission selector member having second keeper means thereon rotatable therewith, said first and second locking means being movable between a locking position wherein they lock said first and second keeper means and said steering control member and said transmission selector member against substantial movement and a retracted non-locking position wherein said steering control member and said transmission selector member are not locked by said first and second locking means, ignition switch means located within said housing means, said switch means being movable between a first position wherein the ignition circuit of the vehicle is completed through said switch means and a second position wherein the ignition circuit is disabled through said switch means, and control means in said housing means and connected to said first and second locking means and said switch means, said control means being movable in one direction for urging said first and second locking means toward said locking position and said switch means toward said second position.

6. Locking apparatus as set forth in claim 5 wherein said first and second locking means each includes a locking pin, said control means includes an actuating plate, key operated means for rotating said plate, a guide member secured to said housing means, a follower slidable in said guide member, said follower being connected to said locking pin of said first locking means and movable from a first position wherein said locking pin is held in a non-locking position to a second position wherein said pin is urged toward a locking position, means on said actuator plate engaging said follower and said locking pin of said second locking means for urging the first and second locking means towards said locking position upon rotation of said actuator plate in one direction.

7. Locking apparatus as set forth in claim 6 wherein said control means includes a shaft connecting said actuator plate to said switch means for moving the latter upon rotation of said actuating plate.

References Cited

UNITED STATES PATENTS

| | | | |
|---|---|---|---|
| 2,147,613 | 2/1939 | Sandberg | 70—239 |
| 3,400,563 | 9/1968 | Lempke et al. | 70—184 |
| 3,442,102 | 5/1969 | Butts | 70—1.5 |

MARVIN A. CHAMPION, Primary Examiner

R. L. WOLFE, Assistant Examiner

U.S. Cl. X.R.

70—252